(12) United States Patent
Bi

(10) Patent No.: US 10,461,597 B2
(45) Date of Patent: Oct. 29, 2019

(54) WINDING STRUCTURE FOR HIGH POWER DENSITY, AXIAL FIELD MOTOR

(71) Applicant: FORTIOR TECHNOLOGY (SHENZHEN) CO., LTD., Shenzhen, Guangdong (CN)

(72) Inventor: Lei Bi, Guangdong (CN)

(73) Assignee: FORTIOR TECHNOLOGY (SHENZHEN) CO., LTD., Shenzhen (CN)

( * ) Notice: Subject to any disclaimer, the term of this patent is extended or adjusted under 35 U.S.C. 154(b) by 309 days.

(21) Appl. No.: 15/527,720

(22) PCT Filed: Oct. 24, 2014

(86) PCT No.: PCT/CN2014/089471
§ 371 (c)(1),
(2) Date: May 18, 2017

(87) PCT Pub. No.: WO2016/061821
PCT Pub. Date: Apr. 28, 2016

(65) Prior Publication Data
US 2017/0324292 A1 Nov. 9, 2017

(51) Int. Cl.
*H02K 3/26* (2006.01)
*H02K 21/24* (2006.01)

(52) U.S. Cl.
CPC .............. *H02K 3/26* (2013.01); *H02K 21/24* (2013.01)

(58) Field of Classification Search
CPC .................................. H02K 21/24; H02K 3/26

USPC .................................................. 310/179–210
See application file for complete search history.

(56) References Cited

U.S. PATENT DOCUMENTS

| 3,231,773 A * | 1/1966 | Henry-Baudot | H02K 3/26 310/111 |
| 3,739,213 A * | 6/1973 | Willyoung | H02K 3/28 310/198 |
| 2007/0090698 A1* | 4/2007 | Yasuda | G03B 7/10 310/12.26 |
| 2015/0146322 A1* | 5/2015 | Bi | G11B 19/2009 360/99.08 |

FOREIGN PATENT DOCUMENTS

WO     2013032405 A1     3/2013

OTHER PUBLICATIONS

International Search Report of PCT Patent Application No. PCT/CN2014/089471 dated Jul. 20, 2015.

* cited by examiner

*Primary Examiner* — Naishadh N Desai

(57) ABSTRACT

The present invention discloses a winding structure and method having a high power density, and motor applying the above. The winding of the present invention has a multilayer 2D structure, has a distributed structure with an electrical angle of 180 degrees and is manufactured in the form of a PCB, wherein each layer arranged only one phase winding. Each phase windings contains 2 layers, or 4 layers, or other even layers, of windings. The number of coil cycles in every layer is the same as the motor poles, the winding layers of a same phase are connected via a through hole, the connecting hole is arranged at a corner of an upper portion of the winding loop inside.

14 Claims, 7 Drawing Sheets

WINDING STRUCTURE FOR HIGH POWER DENSITY, AXIAL FIELD MOTOR

TECHNICAL FIELD

The present invention relates to the technical field of armature winding of a motor, and in particular to a high performance winding, which is a 2D structure for a motor having an axial magnetic field, and a motor applying the above.

BACKGROUND

A motor is an electromagnetic apparatus for conversion of electromechanical energy based on the electromagnetic reaction principle. A Permanent Magnet Synchronous Motor (PMSM) acts as an increasingly important part in modern industries and household products for its relatively higher power density and electric efficiency.

The electromagnetic structure of a motor is normally designed with a radial magnetic field structure, as shown in FIGS. 1 and 2. In FIGS. 1 and 2, the basic structure of a PMSM having an outer rotor is shown, which comprises a rotor housing 1', a rotor permanent magnetic 2', a stator core 3' and an armature winding 4' wound in the stator core 3'. In FIG. 3, an electromagnetic structure of this motor is shown, in which an N pole and an S pole of the rotor permanent magnet 2' are alternatively mounted on the rotor housing 1'.

In the case of the motor structure having a radial magnetic field as shown in FIGS. 1 and 2, the structure of the armature winding is required to be 3-dimensional, as shown in FIG. 3. A 3D winding is formed by using a winding machine, or wounding manually. As such, the dimensions of the winding cannot have a high accuracy.

Alternatively, a motor may also be designed with axial magnetic field structure. Some motor structures using an axial magnetic field may have 2D structures of armature winding. As shown in FIG. 4, such motor structure has a rotor yoke 1", a rotor permanent magnet 2", a stator yoke 3", an armature 4" between the stator yoke 3" and the rotor permanent magnet 2", and a rotor base. This winding is generally a fractional concentrated winding. A three-phase winding is arranged in different places on a same layer in a 2D space, the winding of each phase is not overlapped with the others. This winding may be made by bonding wires, or even Printed Circuit Board (PCB) technique, thus reaching a higher precision in its dimensions. The precision of the winding plays an important role in the motor having an axial magnetic field since it relates to the size of an air gap of the motor and thus affects the performance of the motor.

For the existing axial magnetic field motor, the permanent magnet on the rotor is arranged in space forming an electrical angle of 180 degrees while the span of the fractional concentrated winding in space is less than 180 degrees (e.g. 120 degrees), the use efficiency, in which the winding couples the magnetic field generated by the magnet on the rotor is relatively low. This also makes the motor below in power density and motor constant.

In theory, a 2D winding may also use a span of 180 degrees to improve the use efficiency in utilizing the magnetic field generated by the rotor. However, such winding leads to overlap in windings of the different phases. In this case, the three-phase winding cannot be achieved at one PCB layer. The arrangement, where the three-phase winding must be located on different layers, will induce significant asymmetry with respect to the magnetic performance of the three-phase winding. During the design and manufacturing of the PCB, windings of a same phase located on different layers have to be connected with "blind hole", or "buried hole". This significantly increases the cost of the PCB.

Additionally, if the winding is on different layers, the A-phase winding is closest to the rotor permanent magnet and the C-phase winding is farthest from the rotor permanent magnet. Thus, in the case of a same number of turns, the magnetic field of the A-phase winding is much higher than that of the C-phase winding. Therefore, when the motor rotates, the electromotive force generated in the A-phase winding is much greater than that of the C-phase winding. This will lead to a heavy asymmetry of the electromotive forces in the three phase windings, and this is not allowed in many applications.

SUMMARY

The main object of the present invention is to provide a winding structure for effectively utilizing the magnetic field generated by a rotor permanent magnetic in an axial magnetic field, and a motor applying the above.

In order to achieve the above object, the technical solution of the present invention is as follows.

A winding structure having a high power density, the winding has a multilayer 2D structure and the winding has a distributed structure with 180 electrical degrees, wherein one layer is arranged with only one phase winding, and one phase winding is formed by 2, or 4, or other even number, layers. The winding on each layer consists of winding cycles, the number of which is the same as the motor poles, the winding layers of a same phase are connected via a connecting through hole, and the connecting hole is arranged at a corner of an upper inner portion of the winding loop.

The above winding structure having a high power density is provided with an A-phase winding, a B-phase winding and a C-phase winding, wherein the B-phase winding and the A-phase winding have a difference of an electrical angle of 120 degrees in a tangential direction, the C-phase winding and the A-phase winding have a difference of 240 electrical degrees in the tangential direction, the A-phase winding, the B-phase winding and the C-phase winding form the three-phase winding symmetry in space.

Each of the above A-phase winding, the B-phase winding and the C-phase winding consists of two layer, or other even layer, windings. Take the windings with 6 layers for example, wherein the A-phase winding distributed in the first-layer winding and sixth-layer, the B-phase winding is distributed in the second-layer and fifth-layer, and the C-phase winding is distributed in the third-layer and fourth-layer.

As for the above winding structure having a high power density, the winding structure is manufactured in the form of a PCB.

As for the winding structure having a high power density, when the winding is connected in Y-type, the natural point of the 3-phase winding is arranged at the mostly inner side of a circuit of the PCB.

A motor having an axial magnetic field comprises a rotor yoke, a permanent magnet, a stator yoke, a motor base and a winding structure having a high power density of the motor having an axial magnetic field according to any of claims 1 to 3, wherein the stator yoke is arranged on the motor base, the winding structure is arranged between the permanent magnet and the stator yoke, and the rotor yoke is arranged on the permanent magnet.

As for the motor having an axial magnetic field, the winding on the each layer consists of 6 cycles of winding loops, which correspond to the magnet with 6 poles on the rotor.

The above stator yoke is made of Ferro material.

The above rotor yoke is made of ferrite, or soft magnetic composite material.

The present invention using the above technical solution has effect as follows.

1) PCB technique is used to implement a three phase winding of a axial field three-phase motor, a through hole, which replaces a blind/buried hole, can be used to implement a connection of the winding, thus reducing the cost of the winding;

2) the winding has a span of 180 electrical degrees, thus can couple effectively the magnetic field generated by the rotor magnet;

3) the three-phase winding is symmetric with respect to electrical and magnetic performance;

4) since the yoke of the stator winding, which is made of soft ferrite or wounded core, forms axial and tangential magnetic circuits, the stator loss of the motor can be reduced;

5) since there is only one layer of axial air gap, the thickness of the motor can be reduced;

6) since the winding is implemented in the form of a PCB, the shape of the 2D winding can be arbitrary and the dimensions of the winding can be controlled precisely. The winding presents symmetry because of the specific arrangement of the winding of each phase.

BRIEF DESCRIPTION OF THE DRAWINGS

FIG. 5-1 is a structure diagram of the winding distributed in the first-layer of the PCB to the present invention;

FIG. 5-2 is a structure diagram of the winding distributed in the second-layer of the PCB to the present invention;

FIG. 5-3 is a structure diagram of the winding distributed in the third-layer of the PCB to the present invention;

FIG. 5-4 is a structure diagram of the winding distributed in the fourth-layer of the PCB to the present invention;

FIG. 5-5 is a structure diagram of the winding distributed in the fifth-layer of the PCB to the present invention;

FIG. 5-6 is a structure diagram of the winding distributed in the sixth-layer of the PCB to the present invention;

FIG. 6 is a diagram illustrating the relationship of windings after the three-phase windings are assembled according to the present invention;

DETAILED DESCRIPTION

The object, solution and advantageous of the present invention will be more apparent based on the further detailed description of the embodiments of the present invention with reference to the drawings. It should be understood that the specific embodiments described herein are merely illustrative, but not to limit the present invention.

The present invention discloses a winding structure of a motor utilizing the axial magnetic field with a high power density. The winding is a multilayer 2D structure and has a distributed structure with an electrical angle of 180 degrees. In addition, each layer is arranged with only one phase winding, the winding of each phase is formed from 2, 4, or other even number, winding layers. The winding on each layer is formed from winding cycles (winding loops), the number of which is the same as the number of magnetic poles of the motor.

Figure 1:
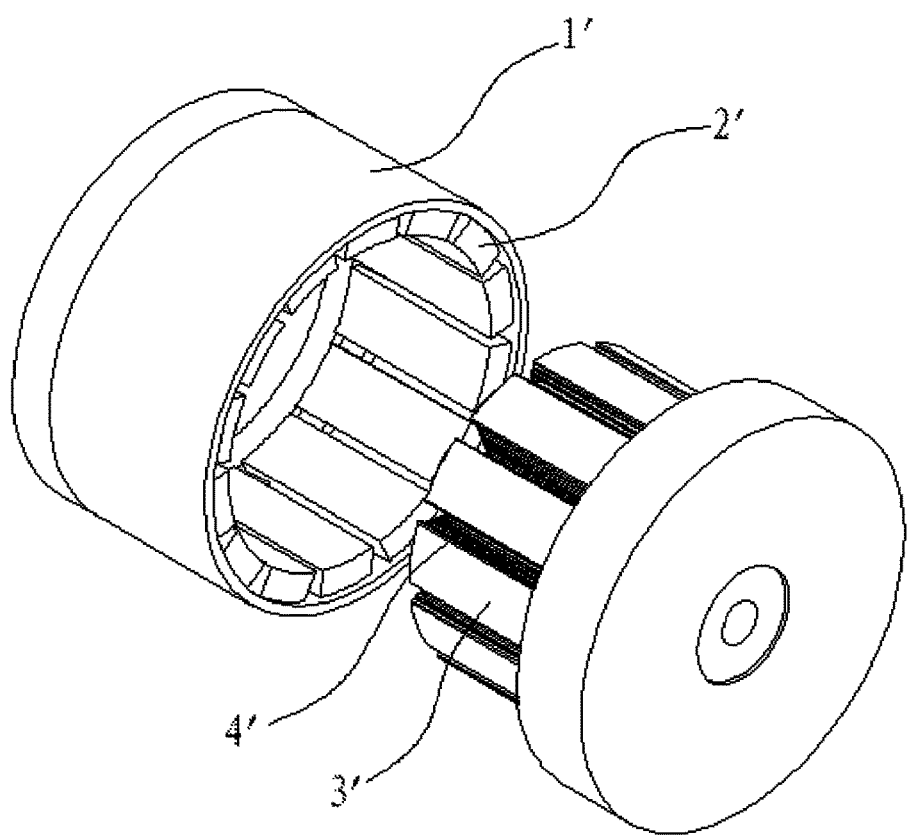
FIG. 1 is a separate diagram of a structure of a normal permanent magnet synchronous motor having a radial magnetic field.
Figure 2:
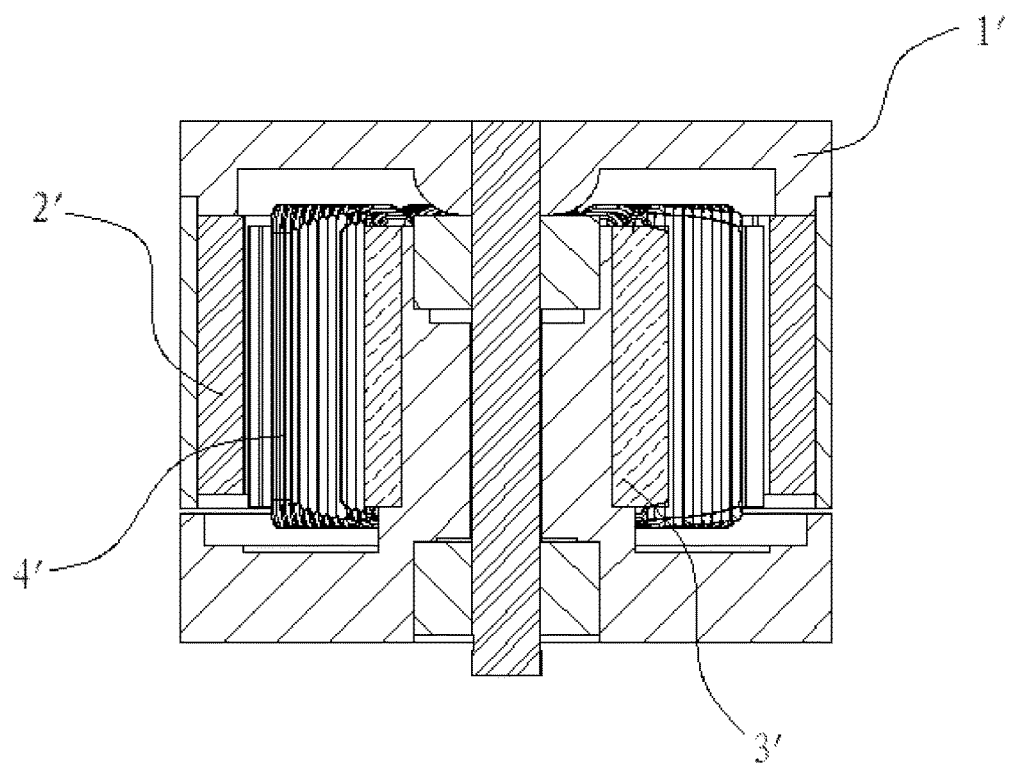
FIG. 2 is an assembly diagram of a structure of the permanent magnet synchronous motor having a radial magnetic field.
Figure 3:
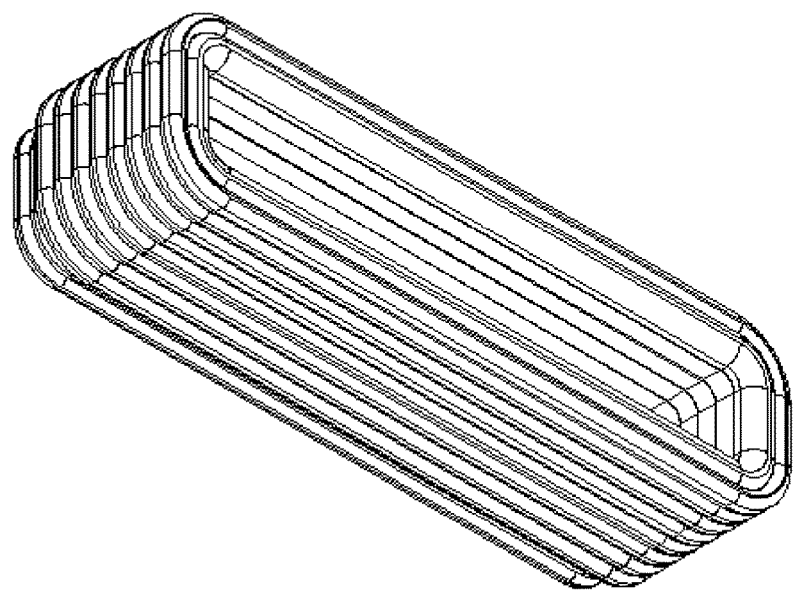
FIG. 3 is a structure diagram of a concentrated winding structure of the normal permanent magnet synchronous motor having a radial magnetic field.
Figure 4:
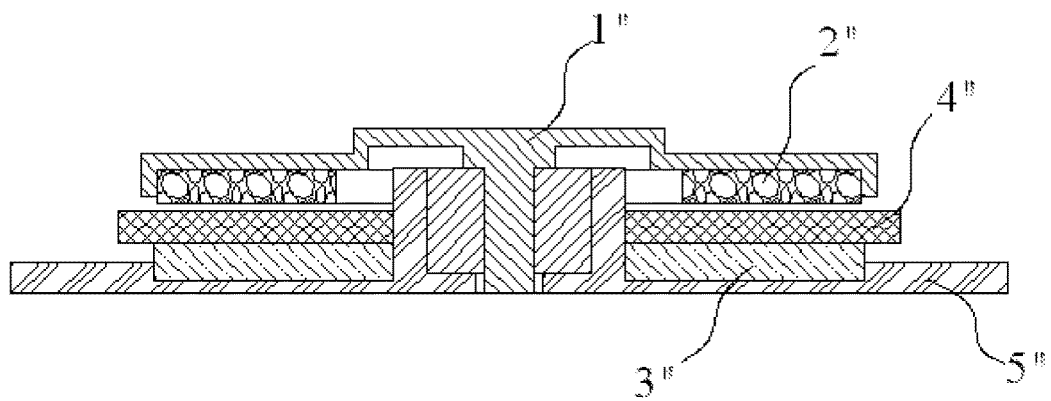
FIG. 4 is a structure diagram of an existing motor having a axial magnetic field.
Figures 1, 5:
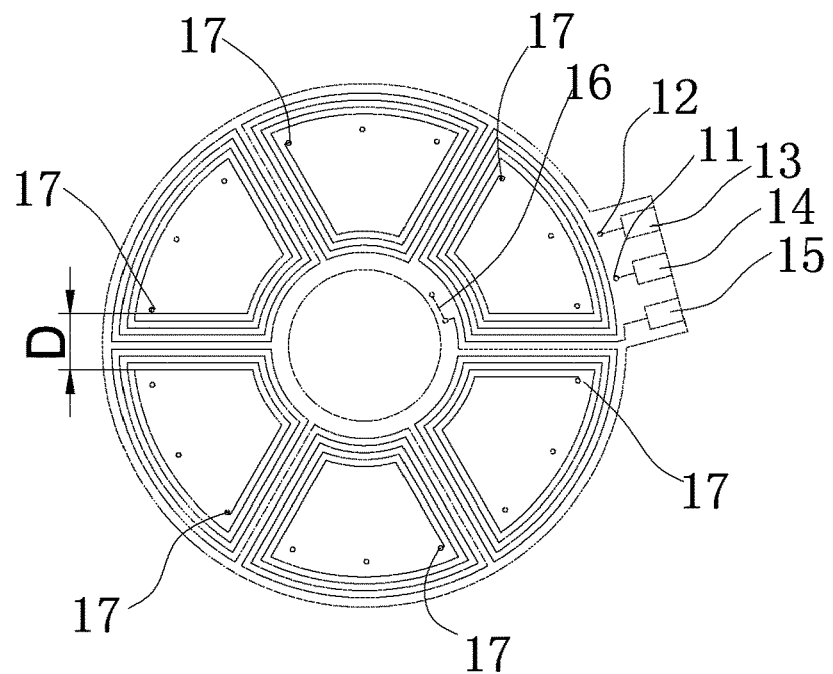
Figures 2, 5:
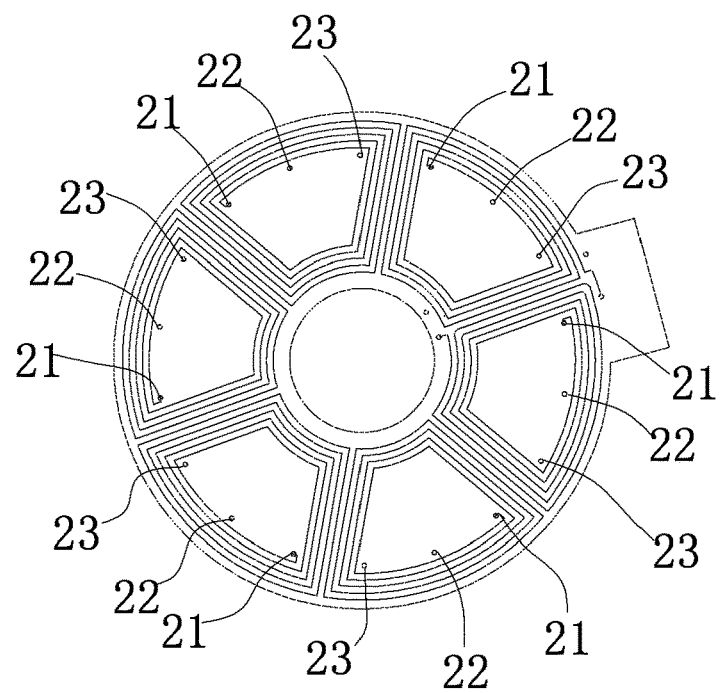
Figures 3, 5:
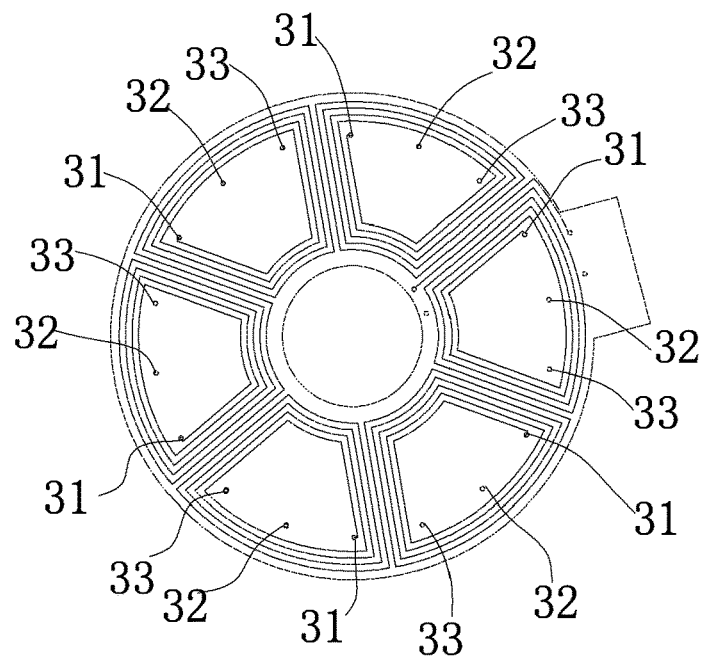
Figures 4, 5:
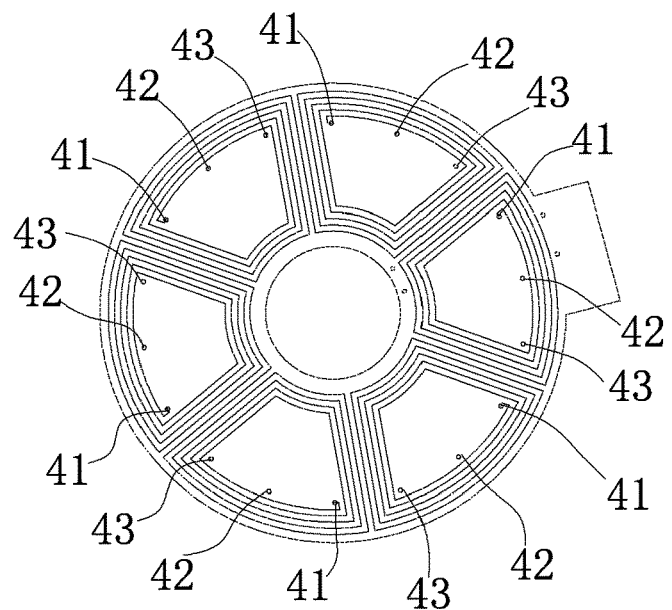
Figure 5:
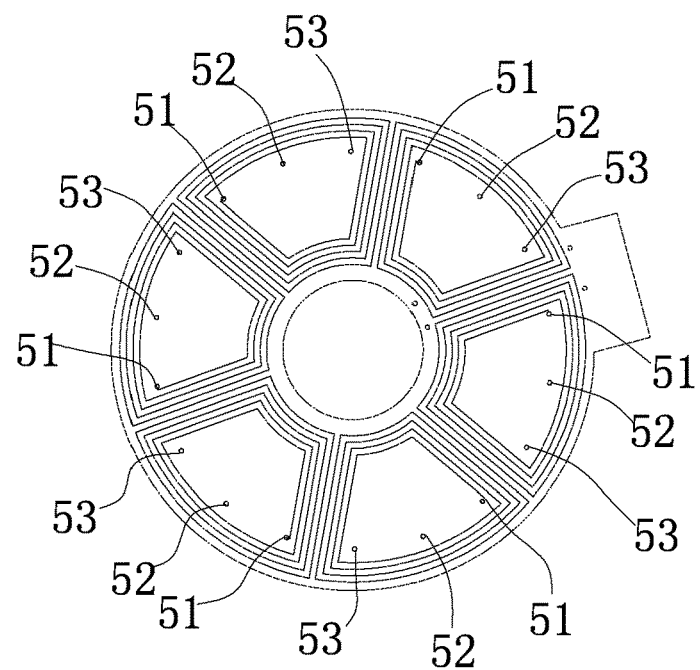
Figures 5, 6:
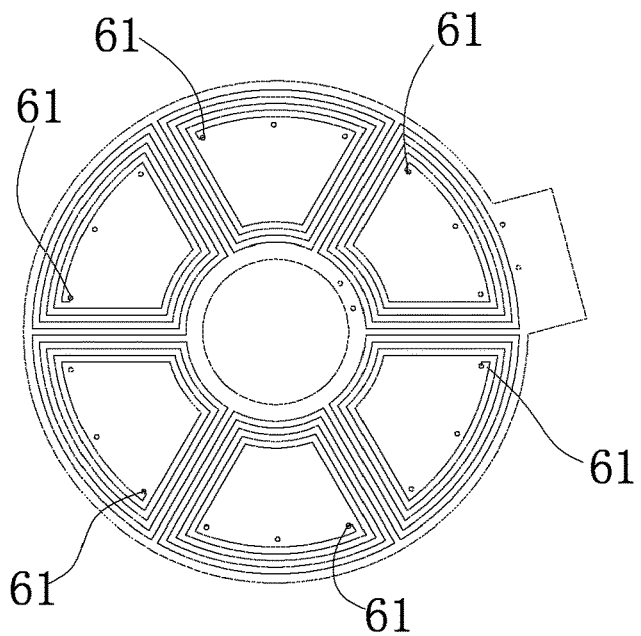
Figure 6:
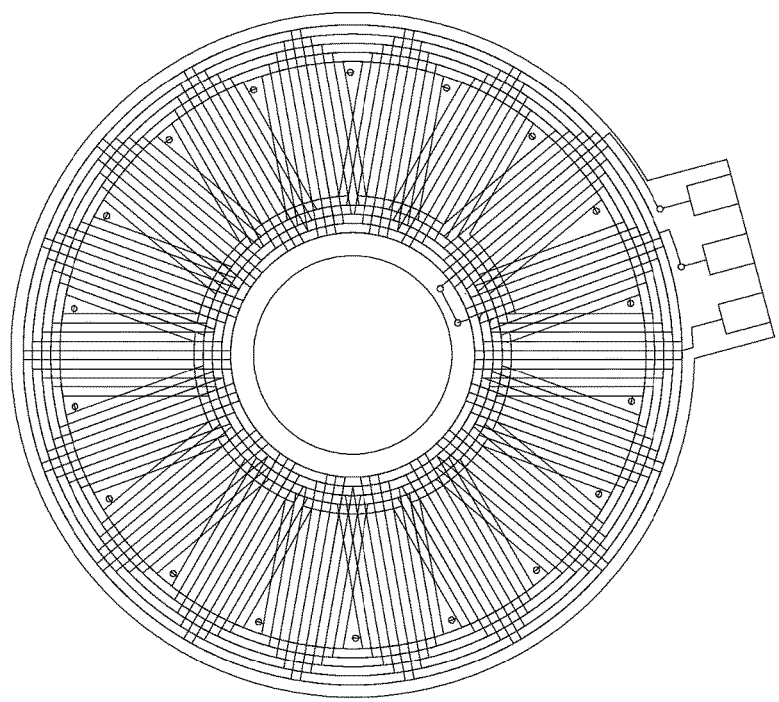

In this embodiment in reference to FIGS. 5-1 to 5-6, the winding comprises 3 phases, i.e. A-phase winding, B-phase winding and C-phase winding, respectively. Specifically, as shown in FIGS. 5-1 to 5-6, the A-phase winding consists of a first-layer winding and a sixth-layer winding; as shown in FIGS. 5-2 and 5-5, the B-phase winding consists of a second-layer winding and a fifth-layer winding; as shown in FIGS. 5-3 and 5-4, the C-phase winding consists of a third-layer winding and a fourth-layer winding.

For all the phase windings, the first-layer winding 1 of the A-phase layer is closest to the rotor magnet, while the sixth-layer winding is farthest from the rotor magnet. Thus, in comparison between the A-phase winding consisting of the first-layer winding and the sixth-layer winding and the B-phase winding consisting of the second-layer winding and the fifth-layer winding, the amplitudes of the back-EMF induced in the A-phase winding and the B-phase winding do not appear much difference. However, since the A-phase winding differs from the B-phase winding by 120 electrical degrees in space, the back-EMF induced in the A-phase and B-phase windings have a difference of 120 degrees in time domain. A three-phase winding in such arrangement can achieve symmetric counter potentials. Since there is not a sensor between the winding and the magnet, the air gap between the rotor and stator of the motor is small, enabling the winding to effectively couple the magnetic field generated by the rotor magnet and thus enhancing the power density of the motor. The motor may also be driven and controlled in the manner of three-phase sensor less drive mode.

As shown in FIGS. 5-1 and 5-6, the A-phase winding is distributed on the first-layer and sixth-layer of the PCB. The first-layer winding has welding areas 13, 14, 15, through which the end of the three-phase winding may be connected to an external circuit.

The terminals of the three-phase winding are connected to the external circuit via connecting wires. The sensor less driving enables the space of the winding within the motor to be mostly used.

In the case that the three-phase winding is connected in Y-type, the portion 16 where the natural line of the windings is connected, as shown in FIG. 5-1, is positioned at the inner side of the winding area, thus improving the use efficiency of space of the winding.

Since the B-phase winding is formed by rotating the A-phase winding with an electrical angle of 120 degrees, the C-phase winding is formed by rotating the A-phase winding with an electrical angle of 240 degrees, the A-phase, B-phase and C-phase windings thus forming a three-phase winding which is symmetric in space. Therefore, As shown in FIGS. 5-1 and 5-6 with respect to the first-layer winding and the sixth-layer winding, a coil on each layer consists of 6 cycles (winding loops), which correspond to the 6 poles magnet on the rotor. Connecting holes 17, 61 are designed to be arranged at corners at the inner side of the winding cycle.

As shown in FIGS. 5-2 and 5-5, three sets of connecting holes 21, 22, 23 and 51, 52, 53 are designed to be arranged on corresponding locations with respect to the second-layer winding and the fifth-layer winding.

As shown in FIGS. 5-3 and 5-4, three sets of connecting holes 31, 32, 33 and 41, 42, 43 are designed to be arranged on corresponding locations with respect to the third-layer winding and the fourth-layer winding.

When the first-layer winding and the sixth-layer winding of the A-phase winding are connected, the connecting hole 17 is connected to the connecting hole 61 of the sixth-layer winding, and the through holes used for the connecting the B and C phase windings cannot affect the distribution of the A phase winding. Meantime, these through hole of the A phase winding cannot affect the distribution of B and C phase windings, too.

In view of the above, the present application enables one layer distributed with one phase winding and a span of 180 electrical degrees. The connection of winding on two layers of each phase is achieved with a connecting through hole in the winding cycle. As shown in FIG. 6, the relationship of the three-phase winding in space is clearly illustrated. It can be seen that in this arrangement of the winding, when the connecting hole of the winding is arranged at a corner in the upper portion in the winding loop, the connecting hole of the winding of each phase will not influence the arrangement of other phase windings. In addition, in most areas, the effective width of the winding area of each phase has an electrical angle greater than 60 degrees.

For all the phase windings, the first-layer winding on the A-phase layer is closest to the rotor magnet, while the sixth-layer winding is farthest from the magnet. Thus, in comparison between the A-phase winding on the first layer and the sixth layer, and the B-phase winding on the second layer and fifth layer, the amplitudes of the potentials induced in the A-phase winding and B-phase winding do not appear much difference. However, since the A-phase winding differs from the B-phase winding by 120 degrees in space, the back-EMF induced in the A-phase and B-phase windings have a difference of 120 degrees in time domain. Similarly, the B-phase winding and the C-phase winding induce back-EMF with substantially same amplitudes with a phase difference of 120 degrees. A three-phase winding in such arrangement can achieve symmetric back-EMF s. Since there is not a sensor between the winding and the magnet, the winding can effectively couple the magnet field generated by the rotor magnet and thus enhancing the power density of the motor. The motor may also be driven and controlled sensor less drive mode.

The present invention also discloses a method of manufacture the above structure of the three-phase winding, i.e. in the form of a PCB. In addition, a connecting hole between a winding of a phase and a winding of another phase is designed at a corner at one side within a winding coil cycle by controlling the width area of the winding. As shown in FIGS. 5-1 and 5-6, at the top inside the winding loop, the width of the winding is slightly less than an electrical angle of 60 degrees, thus maintaining enough distance between the winding of this phase and a connecting hole of a winding of another phase, so as not to contact. In this way, the connecting hole of the winding of each phase may be implemented with a through hole, which will not influence the arrangement of the windings of other phases, as shown in FIG. 6. Thus, the cost of the winding is significantly reduced.

Figure 7:
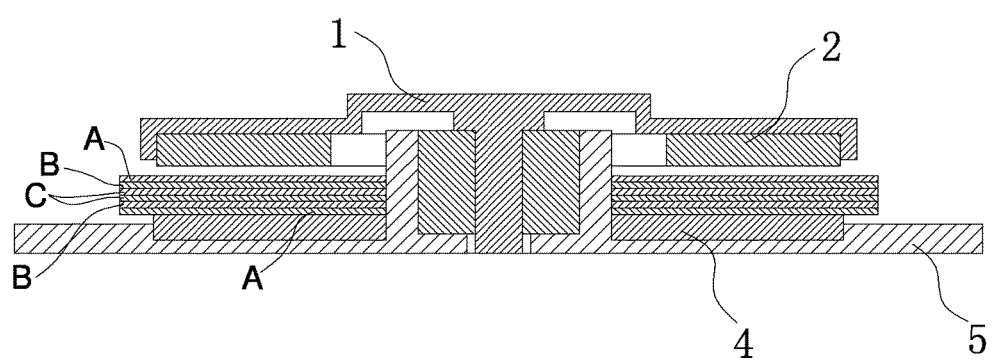
FIG. 7 is a structure diagram of a motor having an axial magnetic field according to the present invention.

As shown in FIG. 7, the present invention further discloses a motor having an axial magnetic field, which comprises a rotor yoke 1, a permanent magnet 2, a winding structure 3, a stator yoke 4 and a motor base 5, in which, the rotor yoke 1 is made of Ferro materials, The stator yoke 4 is made of soft magnetic materials having high resistance and high permeability, such as soft magnetic ferrite, tangential wounded silicon steel sheet, soft composite material (SMC) or other wounded magnetic alloys.

The structure winding 3 is a multilayer 2D structure as described above and manufactured as a PCB. In this embodiment, a coil on each layer consists of 6 cycles (winding loops), which correspond to the magnet of the 6 poles of the rotor.

The stator yoke 4 is arranged on the motor base 5, which could be made of ferrite, or non-ferrite materials. The winding structure 3 is arranged between the magnet 2 and the stator yoke 4. The rotor yoke 1 is arranged on the permanent magnet 2.

Since the A-phase winding consists of a first-layer coil and sixth-layer coil, among all the coils, the first-layer coil is closest to the magnet and the sixth-layer coil is farthest from the rotor magnet The B-phase winding consists of a second-layer winding and fifth-layer winding, and the C-phase winding consists of a third-layer winding and fourth-layer winding.

A three-phase winding made of PCB may be directly mounted to a stator yoke 4 made of a soft magnetic material, as shown in FIG. 7. Since the magnetic field of the stator yoke 4 is arranged in 3D form, in order to avoid generation of eddy current, this yoke should be made of soft magnetic materials having high resistance, such as soft magnetic ferrite, tangential wounded silicon steel sheet, soft magnetic composite material (SMC) or other wounded magnetic alloy.

The motor of the present invention can fully use the space of winding in the motor and thus increase the power density of the motor and reduce the thickness of the motor has a simple structure and its manufacturing is simplified, therefore the reliability and production yield of the motor can be improved.

All the above are merely preferred implementations of the present invention, which are not used to limit the scope of the present invention. Variations and alternatives which can be easily conceived by a skilled person familiar to the technical field in the technical scope disclosed by the present invention are within the scope of the present invention. Therefore, the scope of protection of the present invention should be defined by the appended claims.

The invention claimed is:

1. A winding structure having a high power density, characterized in that, the winding has a multilayer 2D structure and the winding has a distributed structure with an electrical angle of 180 degrees, wherein each layer contains only one phase winding, every phase winding are arranged in an even number of layer windings, and connected with through holes at a corner of an upper portion of the coil loop, the winding structure is provided with an A-phase winding, a B-phase winding and a C-phase winding, wherein the B-phase winding and the A-phase winding have a difference of an electrical angle of 120 degrees in a tangential space, the C-phase winding and the A-phase winding have a difference of an electrical angle of 240 degrees in the tangential space, the A-phase winding, the B-phase winding and the C-phase winding form the three-phase winding symmetry in space.

2. The winding structure having a high power density according to claim 1, characterized in that, each of the A-phase winding, the B-phase winding and the C-phase winding consists of two layer windings, wherein the A-phase winding comprises a first-layer winding and a sixth-layer winding, the B-phase winding comprises a second-layer winding and a fifth-layer winding, and the C-phase winding comprises a third-layer winding and a fourth-layer winding.

3. The winding structure having a high power density according to claim 1, characterized in that, the winding structure is manufactured in the form of a PCB.

4. The winding structure having a high power density according to claim 3, characterized in that, when the winding is connected in Y-type, the natural point of the winding is arranged at the inner side of a circuit of the PCB.

5. A motor having an axial magnetic field, characterized in that, the motor comprises a rotor yoke, a permanent magnet ring a stator yoke, a motor base and a winding structure having a high power density of the motor having an axial magnetic field according to claim 1, wherein the stator yoke is arranged on the motor base, the winding structure is arranged between the permanent magnet and the stator yoke, and the rotor yoke is arranged on the permanent magnet surface for enhancing the air gap field.

6. The motor having an axial magnetic field according to claim 5, characterized in that, the winding on the each layer consists of 6 cycles of winding loops, which correspond to the 6 poles magnet on the rotor.

7. The motor having an axial magnetic field according to claim 5, characterized in that, the rotor yoke is made of soft magnetic material.

8. The motor having an axial magnetic field according to claim 7, characterized in that, the rotor yoke is made of soft magnetic ferrite or soft magnetic composite material, or other soft magnetic materials.

9. The winding structure having a high power density according to claim 1, characterized in that, the winding structure is manufactured in the form of a PCB.

10. The winding structure having a high power density according to claim 2, characterized in that, the winding structure is manufactured in the form of a PCB.

11. The winding structure having a high power density according to claim 9, characterized in that, when the winding is connected in Y-type, the natural point of the winding is arranged at the inner side of a circuit of the PCB.

12. The winding structure having a high power density according to claim 10, characterized in that, when the winding is connected in Y-type, the natural point of the winding is arranged at the inner side of a circuit of the PCB.

13. The motor having an axial magnetic field according to claim 6, characterized in that, the rotor yoke is made of soft magnetic material.

14. The motor having an axial magnetic field according to claim 13, characterized in that, the rotor yoke is made of soft magnetic ferrite or soft magnetic composite material, or other soft magnetic materials.

* * * * *